United States Patent [19]

Wiener

[11] 4,143,546
[45] Mar. 13, 1979

[54] SUCKER ROD PUMP DYNAMOMETER

[75] Inventor: Robert P. Wiener, White Plains, N.Y.

[73] Assignee: Litton Systems, Inc., Mount Vernon, N.Y.

[21] Appl. No.: 871,428

[22] Filed: Jan. 23, 1978

[51] Int. Cl.$^2$ ............................................. E21B 47/00
[52] U.S. Cl. .................................................. 73/151
[58] Field of Search ...................... 73/151, 133 R, 168

[56] References Cited

U.S. PATENT DOCUMENTS

| 3,765,234 | 10/1973 | Sievert | 73/151 X |
| 4,015,469 | 4/1977 | Womack et al. | 73/151 |
| 4,034,808 | 7/1977 | Patterson | 73/151 X |

Primary Examiner—Jerry W. Myracle
Attorney, Agent, or Firm—Brian L. Ribando

[57] ABSTRACT

The work done by a sucker rod pump is read through the use of a pendulum potentiometer mounted on the walking beam of the pump and a load sensing pin located at the lower end of the wire line which is suspended from the horsehead. Meters mounted in a portable reading instrument show the maximum rod pull, the minimum rod pull, the stroke of the pump, and the area of the force-versus-stroke diagram. A display of the shape of the force-versus-stroke diagram may be given through the use of an X-Y plotter.

6 Claims, 3 Drawing Figures

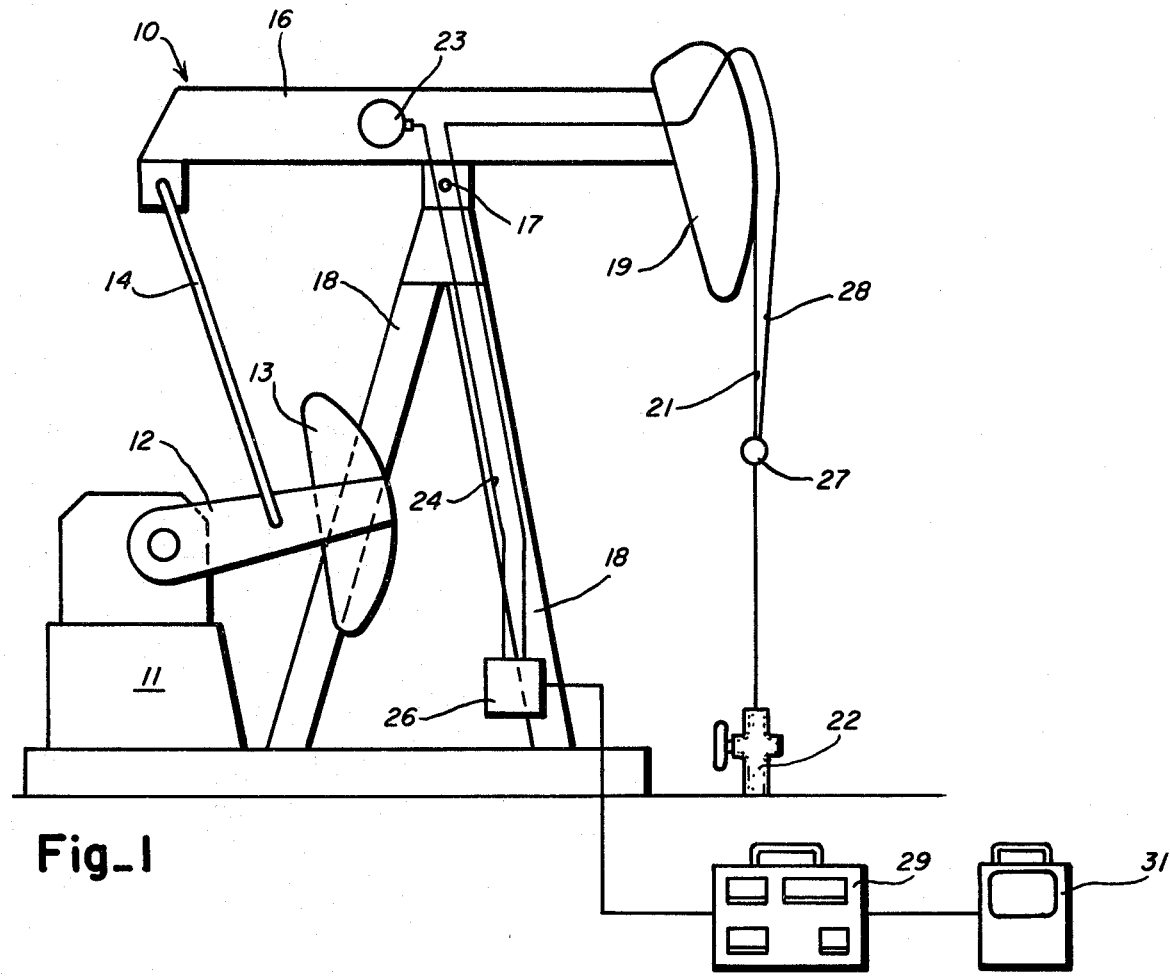
Fig_1
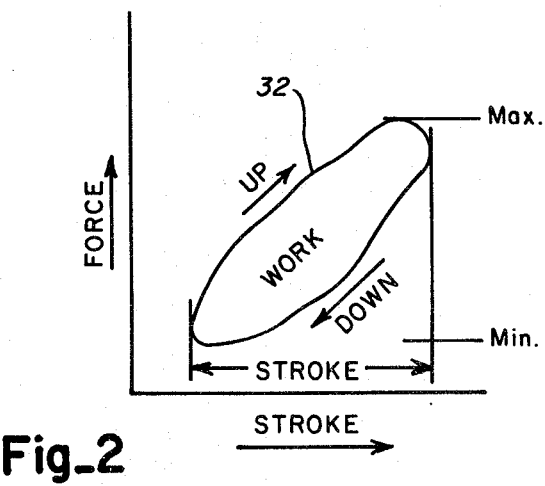
Fig_2

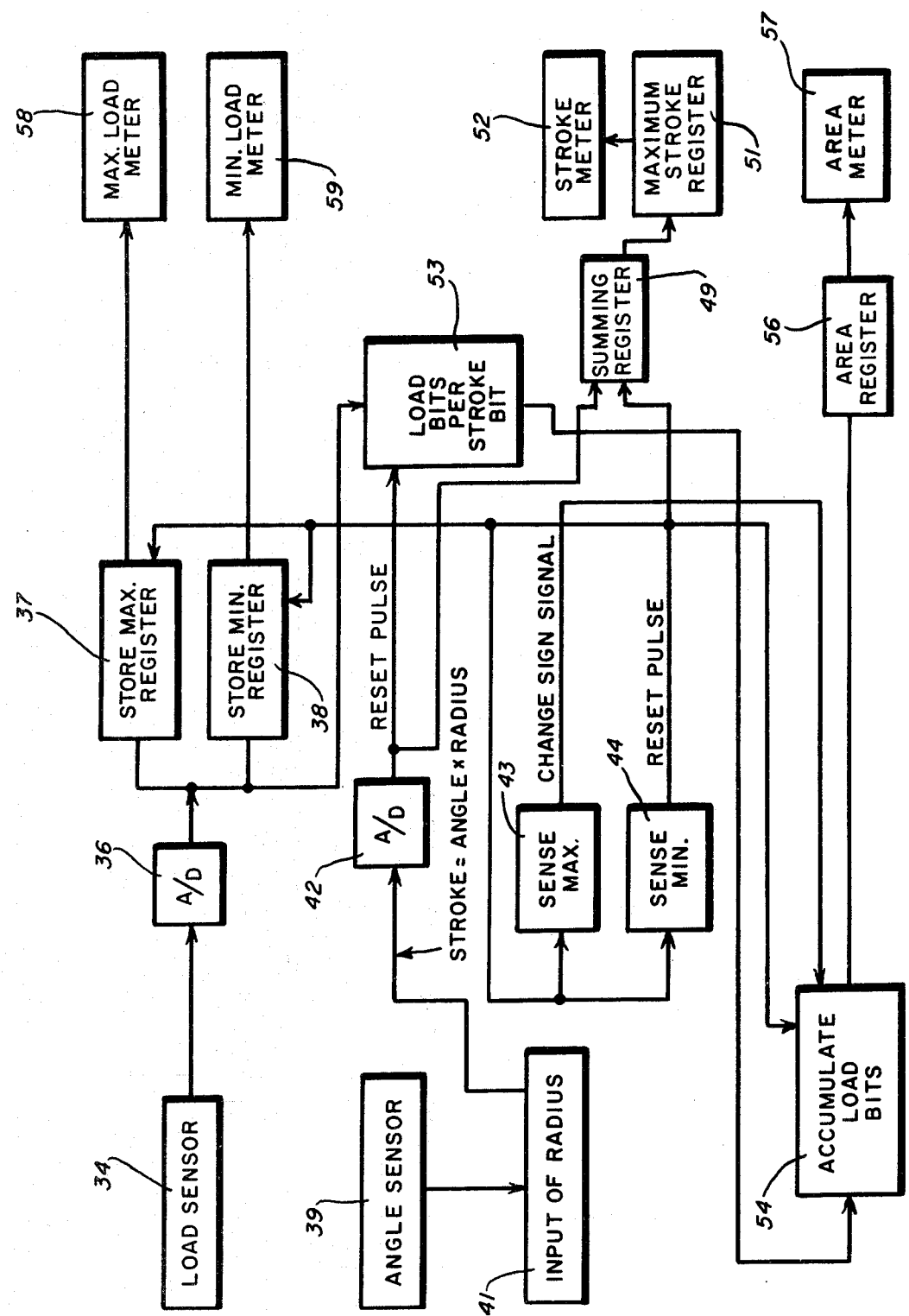
Fig_3

4,143,546

SUCKER ROD PUMP DYNAMOMETER

BACKGROUND OF THE INVENTION

The invention relates to a dynamometer for a sucker rod pump comprising a pendulum potentiometer and a load sensor.

Known prior art methods of reading the forces on a sucker rod pump used in lifting oil from oil wells employ a load cell and a chart which is rotated on a drum by a cable. Such methods produce a diagram which may be analyzed for determining the minimum force on the pump, the maximum force on the pump, the area of the force-versus-stroke curve, and the shape of the force-versus-stroke curve. The area of the force-versus-stroke curve itself is usually measured by means of a polar planimeter. By minimizing the area of the force-versus-stroke curve, the efficiency of the pump can be maximized. Operating characteristics of the pump can be changed by adjusting the position of a counterweight mounted on an arm which is driven by the pump motor. The shape of the force-versus-stroke curve itself is an indication of conditions within the borehole. Prior methods of analyzing this curve do not give exact results and are time consuming.

SUMMARY AND OBJECTS OF THE INVENTION

In accordance with the invention, the dynamometer for a sucker rod pump comprises an angle sensor in the form of a pendulum potentiometer which is mounted on the walking beam of the pump and a load sensor in the form of a strain gauge which is attached to the lower end of the wire which is suspended from the horsehead of the pump. The two gauges may be connected to produce an output on a portable reading instrument which is designed to show the maximum rod pull, the minimum rod pull, the stroke of the pump, and the area of the force-versus-stroke diagram. Optionally, a plotting device may be used to display the shape of the force-versus-stroke diagram. The portability of the reading instrument enables it to be used in reading the forces generated by a plurality of pumps in the field.

It is, therefore, an object of this invention to provide a dynamometer for a sucker rod pump comprising a stroke sensor and a strain gauge.

It is another object of this invention to provide a dynamometer for a sucker rod pump comprising a pendulum potentiometer mounted on the walking beam of the pump and a load sensor mounted on the wire suspended from the horsehead.

It is yet another object of this invention to provide a dynamometer for a sucker rod pump comprising a pendulum potentiometer and a load sensor mounted on the pump and connected to a junction box to which a portable reading instrument may be coupled.

It is a further object of this invention to provide a dynamometer for a sucker rod pump comprising a pendulum potentiometer and load sensor mounted on the pump and connected to a junction box to which may be coupled a reading instrument including an X-Y plotter for displaying the force-versus-stroke curve for the pump, and meters for indicating the maximum load, the minimum load, and the stroke of the pump.

These and other objects of this invention will become apparent from the following detailed description taken in conjunction with the accompanying drawing figures in which like reference numerals designate like or corresponding parts throughout the figures.

BRIEF DESCRIPTION OF THE DRAWING

FIG. 1 is a schematic view of a pump with a dynamometer of the invention affixed thereto;

FIG. 2 is a graphical display of a typical force-versus-stroke curve for a sucker rod pump; and FIG. 3 is a block diagram showing the interconnection of the pump gauges and the meters of the reading instrument.

DESCRIPTION OF THE PREFERRED EMBODIMENT

Referring now to the drawings, there is shown in FIG. 1 a sucker rod pump generally designated by reference numeral 10. The pump is powered by a motor 11 which rotates an arm 12 in a circular path, and a counterweight 13 is movably mounted on the arm in order to allow adjustment of the operating characteristics of the pump. One end of a link 14 is pivotally attached to the arm 12, and the opposite end of the link 14 is pivotally attached to a walking beam 16 of the pump. The walking beam is suported for a rocking movement about a pivot 17 which is mounted on upright supports 18 of the pump. A horsehead 19 is mounted on the end of the walking beam which is opposite the link 14, and a wire line 21 is suspended from the horsehead 19. The wire line descends into a well casing 22.

An angle sensing device 23 such as a pendulum potentiometer is mounted on the walking beam 16. The angle sensing device develops a signal which is proportional to the angular tilt of the walking beam 16, and because of the curvature of the horsehead 19 over which the wire line 21 is strung, the stroke of the wire line is proportional to the angular stroke of the beam. A suitable connection 24 is made between the angle sensing device 23 and a junction box 26 which may be conveniently located at the base of the pump. A load cell 27 is mounted on the wire line 21. The cell 27 comprises a strain gauge device or the like which accurately measures the tensile force on the wire line 21. The load cell 27 is suitably connected by a line 28 to the junction box 26.

A portable reading instrument 29 may be coupled to the junction box by suitable means well known in the art. Optionally, an X-Y plotter or an oscilloscope 31 may be coupled to the reading instrument 29 or may form an integral part thereof. Meters which provide an output representative of the maximum load, minimum load, stroke, and area of force-stroke curve may comprise the reading instrument. The oscilloscope 31 is provided when it is desired that a pictorial display of the force-versus-stroke curve for the pump be given. In that the reading instrument 29 and the oscilloscope 31 are portable and readily detached from the junction box 26, it will be appreciated that the instruments can be used to provide an indication of the operating characteristics of a plurality of pumps in the field.

Turning now to FIG. 2, a typical stroke-versus-force curve is shown. It will be seen that the force on the wire line on the upstroke of the line is greater than the force on the line on the downstroke. The stroke itself is represented by the horizontal extent of the curve which is shown. The maximum and minimum forces on the wire line 21 are represented by the high and low extremes of a curve 32, respectively. The area within the curve 32 represents the work which is done by the pump.

Turning now to FIG. 3, a block diagram of the interconnection of the gauges and the meters of the invention is shown. A load cell or a load sensor 34 develops an analog signal which is proportional to the load supported by the wire line 21. This signal is converted to digital form in a convertor 36, and the output of the convertor 36 is coupled to a register 37 for storing the maximum load and to a register 38 for storing the minimum load. A pendulum potentiometer or an angle sensor 39 develops an analog signal which is proportional to the angular tilt of the beam 16. This signal is altered in accordance with the operating radius of the walking beam 16 by means of a radius input 41 and the altered signal is converted to digital form in a convertor 42. The output of the convertor 42 is coupled to a maximum sensor 43 and a minimum sensor 44, and also through a summing register 49 and a maximum stroke register 51 to a stroke meter 52. The stroke meter 52 may be arranged to give a visual indication of the stroke of the pump. The output of the convertor 36 is summed in a register 53 until a reset pulse is received from the convertor 42 at which time the total of the register 53 is applied to an accumulator 54.

The accumulator 54 continually receives totals from the register 53. These totals are applied as positive counts while the pump is working on the upstroke as depicted on the graph of FIG. 2, and as negative counts while the pump is working on the downstroke. A change sign signal applied to the accumulator 54 from the maximum stroke sensor 43 effects the desired sign change in the sums applied from the register 53. A reset pulse applied from the minimum stroke sensor 44 clears the accumulator 54 and the sum therein held in an area register 56. The sum in the area register can be read out by means of an area meter 57 and this sum represents the work done by the pump. The reset pulse developed in the minimum stroke sensor 44 is applied to the maximum store register 37 and to the minimum store register 38 to gate signals therein to a maximum load meter 58 and a minimum load meter 59, respectively.

Having thus described the invention, various modifications and alterations will occur to those skilled in the art, which modifications and alterations are intended to be within the scope of the present invention as defined in the appended claims.

I claim:

1. An instrument for use with a sucker rod pump comprising a walking beam driven by a motor and a wire line suspended from a horsehead, the instrument comprising in combination:

first means for measuring the stroke of the wire line,
second means for measuring the load on the wire line,
a first meter for indicating the maximum load on the pump,
a second meter for indicating the minimum load on the pump,
a third meter for indicating the stroke of the pump, and
third means for indicating the work which is performed by the pump.

2. The instrument of claim 1 further comprising:
coupling means for removably coupling said first, second, and third means to the pump.

3. The instrument of claim 1 further comprising:
a first register for storing the maximum load on the wire line,
a second register for storing the minimum load on the wire line, and
an angle sensing means comprising said first means.

4. The instrument of claim 3 further comprising:
summing means for totaling an output of the second means,
a first sensor for sensing the maximum output of the first means,
a second sensor for sensing the minimum output of the first means,
accumulator means connected to the first sensor, the second sensor, and the summing means for providing a signal to the third means.

5. The method of analyzing the forces on a sucker rod pump, the method comprising the steps of:
measuring the tilt angle of the walking beam of the pump,
measuring the dynamic load on the wire line of the pump,
storing the maximum load measured and the minimum load measured,
altering the angle of tile according to a dimension of the walking beam to determine the stroke of the wire line, and
accumulating load bits in an accumulator to measure the work done by the pump.

6. The method of claim 5 further comprising the steps of:
sensing the end points of the stroke of the walking beam,
applying a change of sign signal to the accumulator coincident with one of the end points, and
applying a reset pulse to the accumulator coincident with the other of the end points, whereby a signal representative of an area is developed.

* * * * *

UNITED STATES PATENT AND TRADEMARK OFFICE
CERTIFICATE OF CORRECTION

PATENT NO. : 4,143,546
DATED : March 13, 1979
INVENTOR(S) : Robert P. Wiener

It is certified that error appears in the above—identified patent and that said Letters Patent are hereby corrected as shown below:

IN THE CLAIMS:

Claim 5, line 9, after "of" (first occurrence) change "tile" to --tilt--.

Signed and Sealed this

Second Day of October 1979

[SEAL]

Attest:

RUTH C. MASON
Attesting Officer

LUTRELLE F. PARKER
Acting Commissioner of Patents and Trademarks